US006865564B2

(12) United States Patent
Parry

(10) Patent No.: US 6,865,564 B2

(45) Date of Patent: Mar. 8, 2005

(54) METHOD AND SYSTEM FOR PRINTER SUGGESTED TRAINING

(75) Inventor: Travis J. Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 680 days.

(21) Appl. No.: 10/008,286

(22) Filed: Nov. 8, 2001

(65) Prior Publication Data

US 2003/0088528 A1 May 8, 2003

(51) Int. Cl.[7] ............................ G06F 17/00; G06N 5/00

(52) U.S. Cl. .............................. 706/45; 706/12; 706/14

(58) Field of Search ............................... 706/45, 12, 14

(56) References Cited

U.S. PATENT DOCUMENTS 5,324,021 A 6/1994 Onomoto et al.
5,390,004 A 2/1995 Hopkins
5,760,812 A 6/1998 Hopkins
5,956,487 A * 9/1999 Venkatraman et al. ...... 709/218
6,124,938 A 9/2000 Rabb et al.
6,484,149 B1 * 11/2002 Jammes et al. ............... 705/26
6,601,086 B1 * 7/2003 Howard et al. ............. 709/203
2002/0184303 A1 * 12/2002 Uner .......................... 709/203

OTHER PUBLICATIONS http://www.ortech–engr.com/fuzzy/tutor.txt Brule, James F., "Fuzzy Systems—A Tutorial," pp. 1–9.

* cited by examiner

*Primary Examiner*—Anthony Knight
*Assistant Examiner*—Joseph P. Hirl

(57) ABSTRACT

System and methods for printer suggested training using fuzzy logic analysis. A printer tracks printer usage relative to the features of the printer and the type of print jobs performed. Using a fuzzy logic protocol, the printer then selects an appropriate training package based upon the tracked usage. A message is then generated sent to a network administrator, or other user, suggesting the selected training package.

21 Claims, 3 Drawing Sheets

METHOD AND SYSTEM FOR PRINTER SUGGESTED TRAINING

FIELD OF THE INVENTION

The present invention relates to printers. In particular, the present invention relates to a printer that tracks and analyzes its usage using a fuzzy logic protocol. More particularly, the present invention relates to a printer capable of suggesting useful packages related to printer usage such as user training, maintenance or support services or hardware and software upgrades based upon the analysis of printer usage.

BACKGROUND OF THE INVENTION

Printers are well-known computer peripherals widely used in both home and business computing environments. State of the art printers offer ever increasing levels of speed, print quality, easily manipulated format options, and a wide variety of features, such as document collating, stapling, and various levels of print quality. Many printers integrate multiple functions, such as copier, scanner, or facsimile capabilities into the printer. Many printers are sold with the capability to add further functions and features through the installation of software upgrades.

As it is used herein, the term "printer" signifies any device capable of providing printer function alone or, alternatively, any device providing printer function in combination with one or more other document processing functions, such as, for example, copying, scanning, or facsimile capabilities.

Unfortunately, many printers are either under utilized or inefficiently utilized as users do not understand, or are not informed, of potential software upgrades, hardware upgrades, firmware upgrades, printing options, maintenance or service packages, and other printer features that can allow for less expensive or more efficient printer usage. A user must be aware of both the availability of such an item, and that printer usage is of the type that would benefit from an upgrade or training. Learning the details of available upgrades has traditionally required a user to research the manufacturer's website, or printed materials, to examine all available printer related packages and then check their details for desired characteristics. Monitoring printer usage patterns requires users to keep track of all their printing, which is may be impracticable for some networked printers, or to examine and understand the printer event log or usage history files. These activities may be beyond the abilities or merely beyond the "comfort level" of a casual computer user.

A system, including a printer, that monitored printer usage and suggested to the user, or to a network administrator, maintenance packages, other downloads or user training to make printer usage more efficient or reduce printing costs, would thus be an improvement in the art.

Traditional Aristotlean Logic includes the proposition of the law of the excluded middle, that every proposition must be either true or false, a binary system. While the application of this principle in mathematics and engineering has allowed for much of their precision and success, it is often unable to capture the details of an inherently vague decision making process. Attempts to capture intuitive decision making processes have required the development of alternative methodologies.

Fuzzy logic and fuzzy systems were proposed by Lofti A. Zadeh in the seminal articles *Fuzzy Sets*, Info. & Ctl, Vol. 8, pp. 338–353 (1965) and *Fuzzy Algorithms*, Info. & Ctl., Vol. 12, pp. 94–102 (1968), which are incorporated by reference herein. In place of the traditional binary logic, False and True (0 and 1), fuzzy logic uses an infinite valued logic over the range of Absolutely True to Absolutely False (0.0 to 1.0). The manipulation of values within this system allows for inherently vague processes to be controlled in a manner similar to classic logic, while maintaining the inherent intuitive features of the processes. Fuzzy logic control systems take a series of data inputs, convert them into fuzzy values (fuzzification), analyze those values according to a series of algorithms or rules, and result in an output based upon that analysis (defuzzification). Complex processes where a number of inputs and variables are used to create a measurable output, are especially suited for fuzzy logic control.

Fuzzy logic and fuzzy logic systems are increasingly used in control mechanisms for mechanical devices. Examples of systems where fuzzy logic control have proved successful include environmental controls for electronic equipment housing and cement processing equipment. Fuzzy systems have even been used to control laser power and scorotron voltage to optimize print quality in a laser printer, as detailed in U.S. Pat. No. 5,760,812 to Hopkins, issued Jun. 2, 1998, which is herein incorporated by reference. While the incorporation of fuzzy logic into these systems has allowed for more precise and faster control of the mechanisms of these devices, it has not provided for the development of methods or systems to improve the functioning of the controlled device through the selection of support, upgrades, maintenance or other optional services based upon the usage of the device. Inclusion of this feature in a printer, or a method providing such controlled selection in connection with printer would constitute an improvement in the art.

SUMMARY OF THE INVENTION

The present invention addresses the forgoing needs by providing a printer capable of providing monitoring its usage and suggesting upgrades, maintenance packages, user training or other changes based upon patterns of usage. In one preferred embodiment, the printer tracks printer usage relative to the features of the printer and the type of print jobs performed. The printer then selects an appropriate training package based upon the tracked usage. A message is then generated sent to a network administrator, or other user, suggesting the selected training package.

DETAILED DESCRIPTION OF THE INVENTION

The present invention provides a system and methods for improving and maintaining the efficiency of printer use by providing a system that monitors and tracks the usage of the various features of a printer. Using a fuzzy logic protocol, the tracked usage is analyzed and potential upgrades, support services, training procedures, or other packages are selected and suggested to improve printer efficiency.

Figure 1:
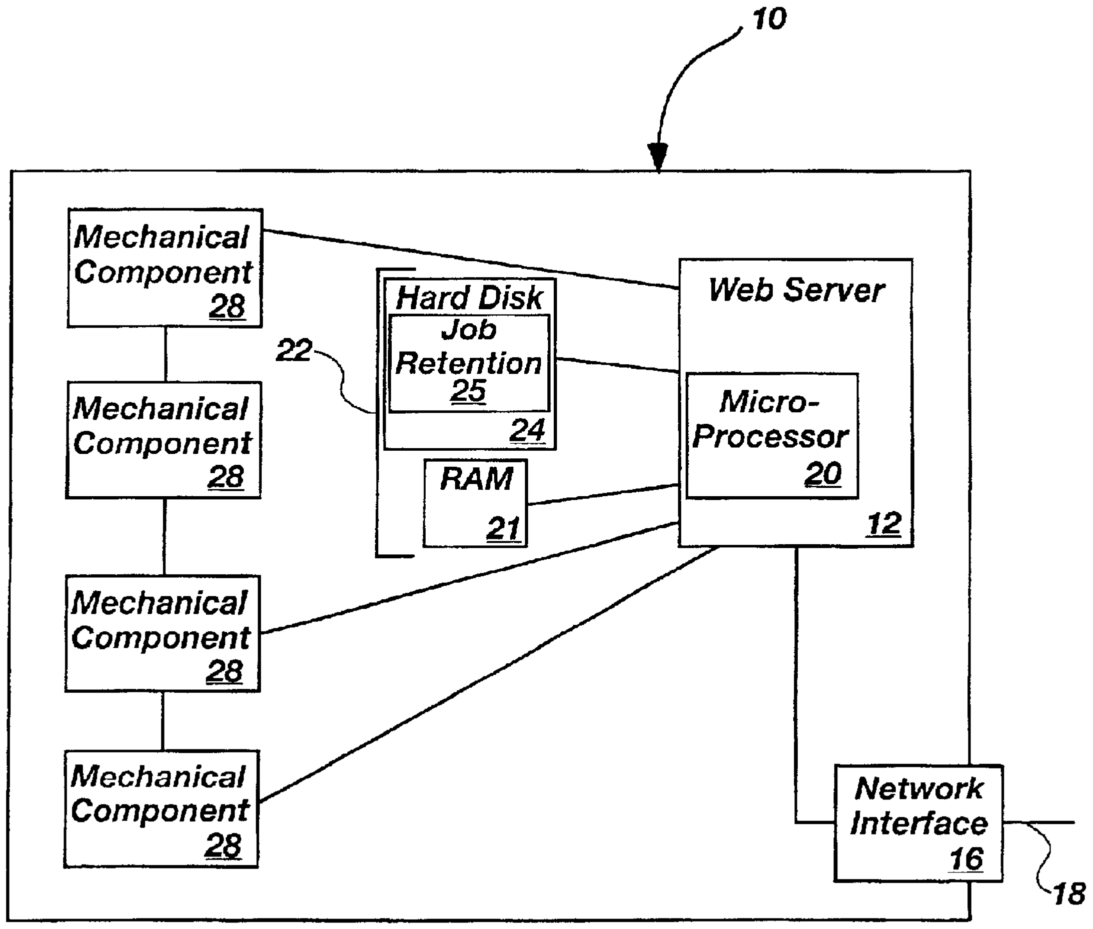
FIG. 1 is a block diagram of a printer, which may be used in the methods and system of the present invention.

Referring to FIG. 1, one possible embodiment of a preferred printer 10 for use in a system carrying out the methods of the present invention is shown. Printer 10 is configured with both printer specific hardware and software. Optionally, printer 10 may include an embedded Web interfacing system (e.g., a Web server 12) for enabling access and interaction with other devices linked to local and external communication networks ("networks"), including the World Wide Web (the "Internet"), a local area network (LAN), a wide area network (WAN), an intranet, the computer network of an online service, etc. The printer specific hardware and software of printer 10 may be provided in any conventional printer configuration known in the art, including those associated with laser printers, impact printers, photographic printers, and inkjet printers. Printer 10 includes a network interface (I/O) 16 for bidirectional data communication through one or more and preferably all of the various networks (LAN, WAN, Internet, etc.) using communication paths or links known in the art, including wireless connections, ethernet, bus line, Fibre Channel, ATM, standard serial connections, and the like.

When present, Web server 12 may preferably provide one or more Web server functions to requesting users linked by way of one or more of the various networks (LAN, WAN, Internet, etc.). Such embodiments may thus be conceptually similar to the printer apparatus configured with an embedded Web server described in U.S. Pat. No. 5,956,487 to Venkatraman et al., assigned to the assignee of the present invention, the disclosure of which is incorporated by reference herein in its entirety.

Still referring to drawing FIG. 1, printer 10 has at least one single microprocessor board (not shown), which includes a microprocessor 20. Microprocessor 20 is preferably part of the existing circuitry associated with a conventional printer. As such, microprocessor 20 is preferably configured to perform some or all of the printer specific functions of printer 10, including control of printer specific hardware and software.

Microprocessor 20 is provided with memory 22 in the form of RAM 21 and/or hard disk memory 14, which may be associated with the print cache of printer 10, or which may be provided separately from the print cache. As used herein, printer memory designated for temporarily or permanently storing one or more print jobs on hard disk memory 14 or other data storage device in printer 10 is referred to as "job retention" 25. In certain embodiments, a percentage of memory 22 in printer 10 may be dedicated to Web server 12. Alternatively, Web server 12 may share the available memory 22 in printer 10 with the print cache. Typically, printer 10 will be equipped with a minimum of 64 megabytes of RAM 21, although less RAM may be used in certain configurations.

Microprocessor 20 is configured to follow a set of instructions either embedded therein, or stored in memory 22, to track the usage of different characteristics of printer 10 and select among possible options for improving printing usage to make suggestions to a user of the printer 10. Preferably, microprocessor 20 of printer 10 is further configured to translate coded language received from printer drivers of networked workstations into a bit-mapped image format (raster image format), and to store the translated print files in high capacity memory storage (i.e., job retention 25). Thus, the resulting "RIP'ed" print jobs, representing graphical images of text or drawings along with associated print attributes, are stored in job retention 25 as "print ready files."

In embodiments including a Web server 12, it is preferred that microprocessor 20 be responsible for controlling the all aspects of Web server 12. Thus, microprocessor 20 may be configured to process communication protocols and executable programs associated with Web server 12 which are stored in ROM (not shown) and/or hard disk memory 24. In one preferred embodiment, Web server 12 uses microprocessor 20 and the ROM-stored protocols to exchange data with other devices/users on one or more of the networks via Hyper Text Transfer Protocol (HTTP) and Simple Mail Transfer Protocol (SMTP), although other protocols such as File Transfer Protocol (FTP), Simple Network Management Protocol (SNMP), and Gopher document protocol may also be supported. Web server 12 may further be configured to send and receive HTML formatted files. In addition to being linked to a local area network (LAN) or wide area network (WAN), printer 10 may be linked directly to the Internet via network interface 16 and communication links 18 attached thereto.

Printer 10 will preferably contain executable software programs stored on hard disk 24 related to the operation of printer specific hardware. Hard disk 24 may also contain printer specific software programs relating to the operation of Web server 12, in those embodiments including a Web server 12. Alternatively, a separate hard disk (not shown) may optionally be provided with the requisite software programs for printing.

Mechanical components 28 of printer 10 are the mechanisms that are used to handle paper, to print documents, to assemble documents or to provide other additional functional characteristics to the printer 10. Mechanical components 28 may include the paper feeding mechanism, the inkjets of an inkjet printer, the laser scanning assembly and revolving drum and other associated mechanisms of a laser printer, other printing mechanisms known to those skilled in the art (now or in the future), a document collator, a document binder, a stapler, or any other mechanical component that may be included in a printer 10 to increase its functionality.

Figure 2:
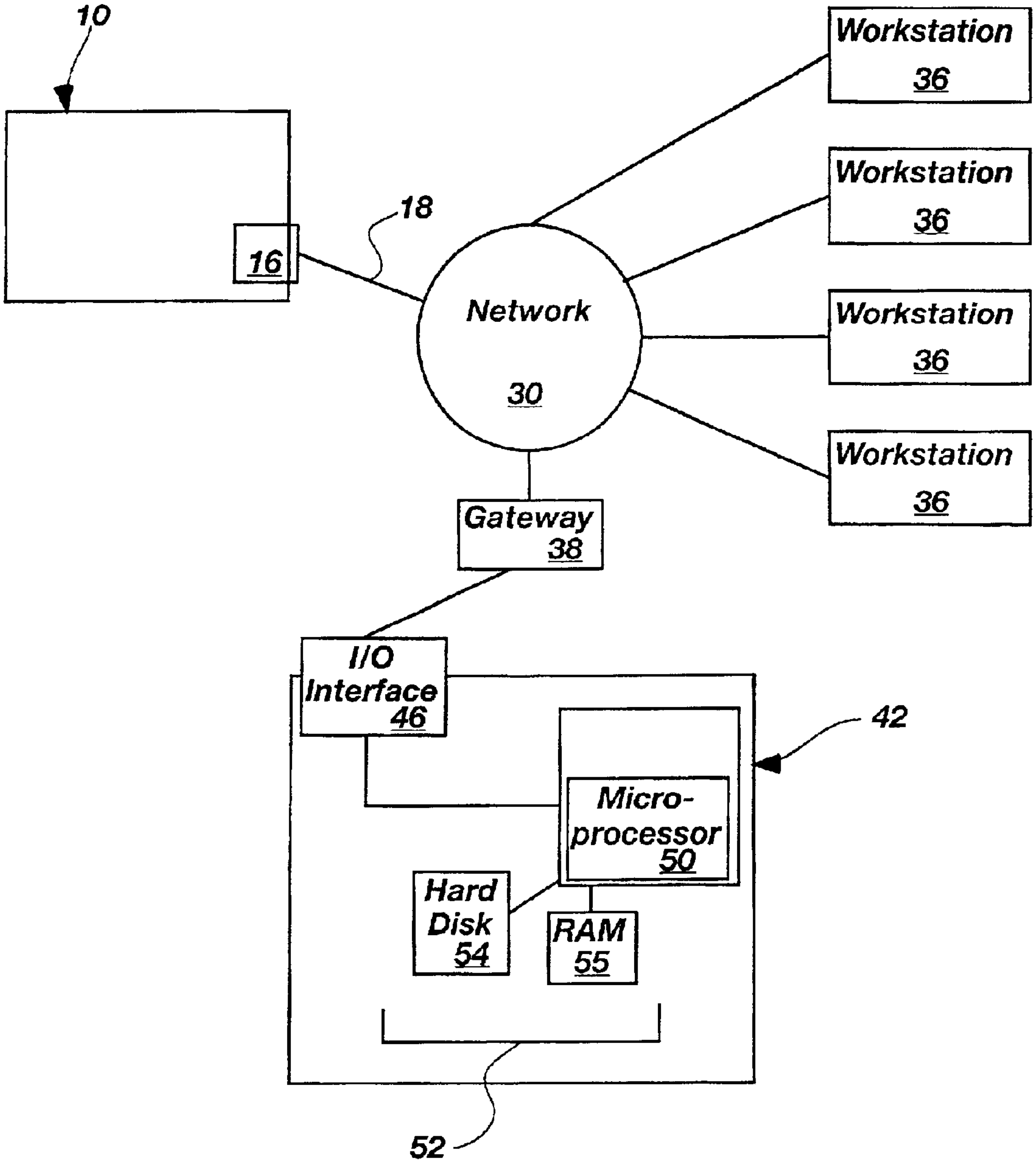
FIG. 2 illustrates a system of network components that may be advantageously used in the methods and system of the present invention.

Referring now to drawing FIG. 2, printer 10 is shown as connected to a local computer network 30 to which are connected a number of computer workstations 36. Printer 10 is able to accept print jobs from each workstation 36 through network operative connections as known to those skilled in the art. Local network architecture 30 also includes a gateway 38, which will typically comprise a software and/or hardware firewall. Gateway 38 functions to block various external data transmissions from being sent to locations residing inside local network architecture 30. Gateway 38 also provides a port for outgoing Internet traffic. Gateway 38 is further preferably configured to internally route IP-Packets sent from workstations 36 to other web-based devices (e.g., printer 10) also residing within local network architecture 30, and vice versa.

An external computer 42 includes an I/O interface 46 that allows connections to be made to a computer network, including an Internet or other connection, similar to network interface 16 discussed above. External computer 42 includes a microprocessor 50, which is provided with a memory 52. Memory 52 preferably includes RAM 55 and hard disk 54. Memory 52 may also include any other data storage devices or systems that are useful in practicing the present invention. Preferably, external computer 42 functions as a web server that may communicate with printer 10 by conveying messages over network 30 via gateway 38.

Making reference to FIGS. 1 and 2, one possible embodiment of system using a fuzzy logic protocol to select among possible printer related items will now be discussed. It will be appreciated that the examples used and methods discussed are illustrative only and do not limit the present invention.

In a typical printing process over a network environment, such as network 30, a user at a computer workstation 36 typically uses print driver software to load documents or images into a buffer (usually an area on a disk of a workstation 36), where a printer 10 pulls them off the buffer at its own rate. The print driver functions to convert the text, graphics and print attributes specified by the user's workstation 36 into a set of codes that the printer 10 can translate and/or read. The set of codes is typically a version of Printer Control Language (PCL), developed by Hewlett-Packard for its dot-matrix, inkjet, and LaserJet series printers. The version of PCL most commonly used as the printer coding language is Page Description Language (PDL). Once the text, graphics and print attributes have been converted to PDL, the PDL is transmitted by the workstation 36 over the network 30 where it is received by the printer 10 as a "print job."Examples of PDLs include Hewlett Packard's HP-GL/2 language and Adobe's PostScript 7.

As the printer 10 receives the coded language from the print driver, it stores the information in high capacity memory storage (job retention 25), which typically comprises random-access memory (RAM 21) or hard disk 24. A stored print job thus comprises of one or more electronically stored files and the print attributes associated therewith. Before a typical print job (e.g., a PDL file) can be printed, however, its contents must be converted to a bit-mapped image format, also known as a raster image. The raster image is a bit-mapped representation of the document to be printed, with each bit in the bitmap representing the absence or presence of a dot (or pixel) on the printed page. A raster image processor ("RIP") in the printer 10 typically translates PDL files to a raster image, also called a "RIP'ed" version of the file. Thus, the print files include data representing graphical images and the RIP'ed version is generated from the print file. Typically, print jobs are RIP'ed before storage in job retention 25, making them "print ready files." In some cases, print jobs are received by the printer 10 in the form of raster image data. In that case, a processor 20 in the printer 10 may engage in pixel image manipulation when storing the print job. The printer 10 then uses the data in the print ready file to control the mechanical printing components 28 and the printing steps, such as paper feeding, controlling the inkjets of an inkjet printer or the laser scanning assembly and revolving drum and other associated mechanism of a laser printer.

As discussed above, the text, graphics and print attributes specified by the user's workstation 36 must be converted into a set of codes that the printer 10 can translate and/or read. The codes thus contain instructions for each feature of printer 10 that will be utilized in processing and printing the print job. The present invention includes a system and methods of tracking the usage of these features and suggesting printer related packages based upon such usage.

Figure 3:
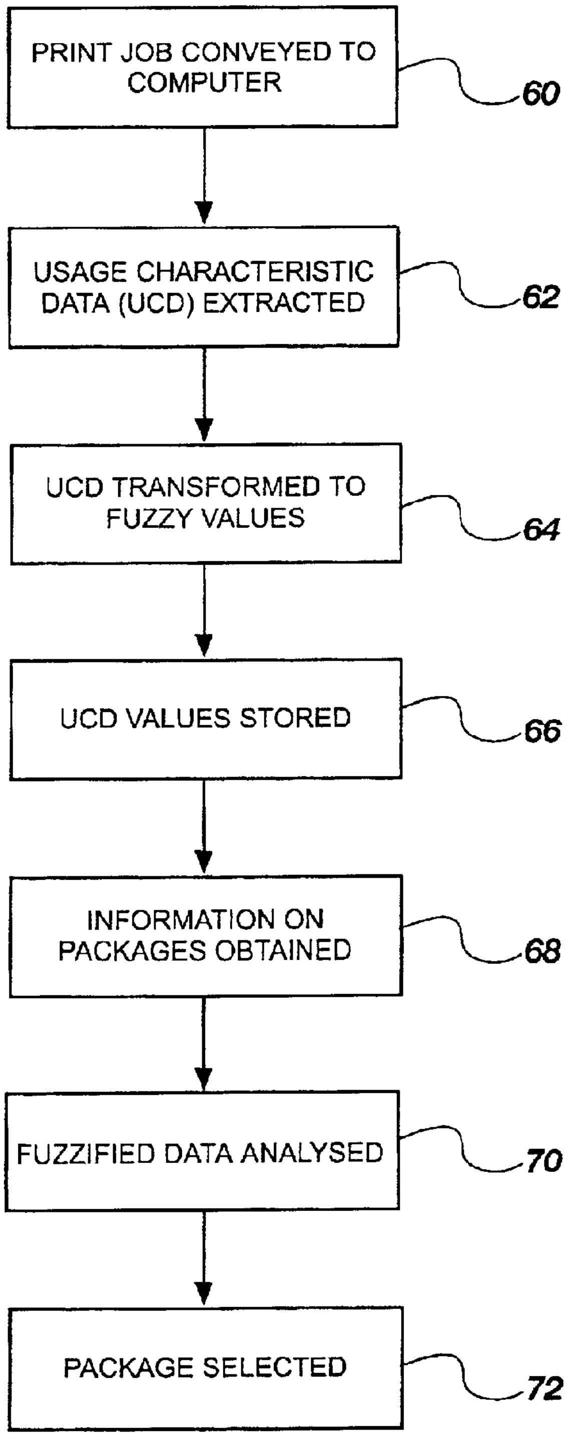
FIG. 3 is a diagram used to explain one possible method of transforming printer usage information into a fuzzy logic protocol for se in some embodiments of the present invention.

Turning to FIG. 3, a flowchart depicting the process of suggesting a change in printer support packages is depicted. A print job is conveyed to a printer 10, as shown in box 60. The print job may be received at the printer 10, or pulled by printer 10 off a print buffer. The printer 10, following a set of instructions, extracts usage characteristic data (UCD) from the print job, as shown in box 62. UCD consists of information on the usage of the printer 10, including information on the use of the functional features of the printer 10. Some examples of UCD include, the number of pages printed in each print job, the amount of toner or ink used in a print job, the source of paper used in a print job, the composition of a print job whether graphic or textual matter or a combination thereof, if the print job uses any additional functional features of the printer 10 such as a document collator or a stapler, and any other details of a print job that may be of interest. Further, use of any features of printer 10 may constitute UCD whether or not it is associated with a print job. For example, if printer 10 contains a web server 12, use of the web server 12 to access the internet may constitute a UCD that is tracked. Information on the printer 10 other than the use of printer 10 features may similarly constitute UCDs. For example, the maintenance or support package currently in use with respect to the printer 10, the version of the printer driver or other software currently used by printer 10, or any other information of interest associated with the printer may form a UCD that is desirable to collect and track.

The UCD is "fuzzified" or transformed for use in a fuzzy logic protocol, as depicted in box 64. It is preferred that this be performed by microprocessor 20 following a set of instructions. The fuzzification process takes the raw UCD and presents it in a form that may be used in a fuzzy logic protocol, assigning a numeric value to its aspects. This process will be explained with the following examples, although it will be appreciated that this technique may be used with any desired UCD. It will be further appreciated that the several protocols for fuzzifying data are known in the art and any such protocol may be used and is within the scope of the present invention.

For a first example, one desired feature to be tracked is the per page usage of toner in a document. This may be measured by several UCDs including: the average toner density per page, the average total toner used per page, the average percentage of the printable page on which toner is disposed, or other suitable measures. Assuming the percentage of page on which toner is disposed is a desired UCD, each page of a print job will have toner disposed on between 0% and 100% of the printable area of the page. A fuzzy value set is created with 0% toner per printable page area at 0.0 and 100% toner per printable page area at 1.0. The average per page for each print job may be calculated and a corresponding fuzzy value assigned. A print job with an average of 40% toner per printable page area would thus have a fuzzy value of 0.4.

As a second example, another desired UCD may be the use of the printer 10 to create multiple copies of the same document. If the printing of 7 or more copies of the same document is considered to constitute a high usage of this feature, a fuzzy value set can be created with 1 copy per print job set at 0.0 and 7 copies per print job set at 1.0. The fuzzy value for a print job may thus be calculated and assigned. A print job that results in 4 copies of the document would thus have a fuzzy value of 0.57.

A third example, the age of the version of the printer driver in use on the printer may be another desired UCD. A fuzzy value set may be created with the most recent version of the printer driver, with a installation date corresponding to the present may be set at 1.0 and an earlier version of the printer driver with an installation date of four years prior to the present may be set at 0.0. The fuzzy value for the age of the print driver may this be calculated and assigned. A print driver installed 2.5 years ago would thus have a fuzzy value of 0.375.

It will be appreciated that any UCD can be tracked and any fuzzification process can be used on the tracked data following protocols similar to the above examples. All such fuzzification processes are within the scope of the present invention.

The UCD data is stored in a memory 22, as shown in box 66. It will be appreciated that the fuzzification of the UCD data may be performed prior to storage, as a part of the storage process or upon extraction of the data from storage at a later time. Preferably, UCD data is stored in a memory 22 on printer 10, although it will be appreciated that this data may be stored elsewhere. Preferably, the UCD data for each characteristic is stored for each print job that is received by the printer 10. Alternatively, average values for each UCD may be stored and revised at each print job.

Information on available packages is obtained. In one preferred embodiment, this information is embedded within the memory 22 of the printer 10. In another preferred embodiment, this information is obtained at periodic intervals by being downloaded from the internet. On example of this second preferred embodiment would occur on a printer 10 equipped with web server 12. At the periodic interval (such as the end of a week, month, or calendar quarter) the web server 12 communicates with server 42 over the communications link 18 and network 30 (which may include the internet), downloading information on available packages. Preferably this information includes a formula that can be calculated from UCD scores yielding and ideal score that corresponds to the ideal situation the package is intended to improve. More preferably, the information contains a summary of the package and instructions on obtaining the package.

The fuzzified UCD data is analyzed, as shown in box 70. Preferably, this is accomplished by the microprocessor of printer 10. The analysis is preferably performed by microprocessor 20 following a set of instructions, and may occur in several ways. In some preferred embodiments, a formula for UCD scores is downloaded with each available package, each of these formulas is calculated yielding a number of scores. In some alternative embodiments, a single standardized formula score may be calculated resulting in a single score. In other embodiments, the fuzzified UCD scores may be merely transformed into average fuzzy values for each UCD.

Once the fuzzified UCD data has been analyzed, a package is selected, as shown in box 72. In embodiments where a single formula is used to calculate a single score, the single score is compared to the scores corresponding to each available package. The numerically closest score corresponds to the selected package. It will be appreciated that in such embodiments, the single score may be calculated prior to downloading information on available packages. In such embodiments, only information on a selected package may need to be downloaded by the printer 10. In other preferred embodiments where a number of scores are calculated corresponding to each available package, each calculated score is compared to the corresponding ideal score for that package. In other embodiments, the average fuzzified UCD scores may be directly compared to a number of ideal UCD scores that accompany each available package. The package having the least difference between the calculated score and the ideal score is then selected.

To further clarify the analysis process and the selection process, the following examples are presented. It will be appreciated that these examples are illustrative only and do not limit the scope of the present invention, which is defined by the claims.

Assuming a UCD for a paper stapling device, a mechanical component 28 of a printer 10, has a calculated fuzzified value of 0.1 and a UCD for multiple page jobs has a calculated fuzzified value of 0.9. One possible training package for the printer 10 centers on the use of the collating and binding functions of the printer 10. The fuzzy selection calculation for this package is the fuzzy value of the UCD of the paper stapling device subtracted from the fuzzified value of the UCD of multiple page jobs. The ideal score for selection is 0.9. During analysis the printer 10 calculates this score as 0.9−0.1=0.8. This is compared to the ideal score and the difference of 0.1 is calculated. Similarly, the difference for the other available packages is calculated. The package with the least difference is selected. Assuming the collating and binding training package has the least difference between the calculated score and ideal score, it is then selected. Alternatively three, five or another number of packages with differences in decreasing order may be selected to generate a list of selected packages.

An additional example, assuming a UCD for the number of pages printed on the printer 10, has a calculated fuzzified value of 0.2 and a UCD for a maintenance and support package is 0.9 (corresponding to contracted printer support with a cost calculated on a monthly basis). Information on support packages currently in use, including a fuzzified UCD value, may be downloaded by the printer 10, kept track of through software or obtained by any other method known to those skilled in the art. One possible maintenance and support package for the printer 10 provides printer support on a per page cost basis. The fuzzy selection criteria for this package is a fuzzy value for the UCD of the number of pages printed of lesser than or equal to 0.2 and a fuzzified value of the UCD of the maintenance and support package of greater than or equal to 0.8. During analysis the printer 10 compares these UCD values to the ideal UCD values and the differences are calculated. Similarly, the difference for the other available packages is calculated. The package which most closely resembles the ideal scores for the package is selected. Assuming no other package is more appropriate, this package is selected. Alternatively, a number of packages which are indicated may be selected as a list of the three, five or other number of most appropriate packages.

For a third example, assume that fuzzified UCD values are calculated for various aspects having to do with toner usage by the printer 10. Scores for average toner density, average printed page area, printing of text documents versus graphic documents, and other characteristics affecting toner usage may be calculated. Information on various packages for toner usage is embedded or downloaded. Formula calculations and ideal scores designed to maximize print quality with reduced toner usage are associated with each package. Calculated scores are generated and compared to the ideal scores for each toner usage package. The toner usage package with the least difference between the calculated score and the ideal score is selected. For example, if the printer 10 calculates the least difference between a toner "miser" package that reduces the amount of toner used per page is suited to the printer usage, this package is selected. Installation of the selected "miser" package will reduce the costs of printing. Alternatively, if the printer 10 calculates the least difference between the calculated score and the ideal score for a toner "graphics" package which uses more toner per page, while optimizing the appearance of printed graphic images, then that package will be selected. Installation of this package will increase the acceptability of printed documents.

It will be appreciated that a printer 10 using the methods of the present invention may be used to track any desired UCDs and select packages that are associated with those UCDs to improve printer 10 usage and user satisfaction therewith. The methods and systems of the present invention can thus be used to select and suggest packages for firmware upgrades, user training, support and maintenance services, and any other packages that may be used to increase printer functionality, quality or reduce costs.

Once a package is selected, it is suggested to a user of the printer 10. In network printing environments, this user is typically the network administrator, although any suitable user may be selected. This may be accomplished by conveying a message containing information on the selected package, or list of selected packages, to the user. The message may be generated as an email message that is conveyed to the user over the network using SMTP or another suitable protocol. In embodiments of printer 10 that include web server 12, it is preferred that web server 12 be used to assemble and convey the message over the network. It will be appreciated that any other suitable method for conveying a message containing details of a selected package to the user may be used to suggest the selected package or list of selected packages to the user, and all such methods are within the scope of the present invention.

In some possible alternative embodiments, selected packages may be installed for use on the printer 10 directly, rather than suggested to a user. In these embodiments, the possible packages may be retained in the memory 22 of the printer 10. When a package is selected, it is accessed from the memory 22 and installed. In other embodiments, the selected package may be downloaded by the printer 10, using web server 12 to access and download the package from a remote computer 42 over the network 30 and/or the internet. This may be accomplished using FTP or another suitable protocol. Once the package is downloaded, it may be installed as known in the art. This allows printer efficiency to be maintained and improved without the need for action by a user.

Accordingly, the present invention includes a method of suggesting packages to improve printer usage based upon the actual usage of the printer 10. Such a method comprises conveying a print job to a printer 10 including one or more functional characteristics, where the print job requires the utilization of at least one functional characteristic; assigning a numerical value to the degree of utilization of the at least one functional characteristic; maintaining that numerical value in the printer memory 22; accessing information on a number of packages; comparing the information to the numerical value in order to select a preferred package; and then suggesting that preferred package to a user of the printer 10. The packages may be maintenance and support packages, training packages, or any other package of information that may be used to improve user's knowledge of the printer, improve printer efficiency or reduce printing costs.

Preferably, the print job will require the use of a number of the functional characteristics of the printer 10, requiring that individual numerical values be assigned for the degree of utilization of each of the functional characteristics that are used; and the maintenance of the individual numerical values in the printer memory 22. Comparing the information to the maintained numerical values for such embodiments may further comprise analyzing the individual numerical values to select based upon a number of said individual values. This may be done by inputting the individual numerical values into a formula to arrive at an output value and then selecting the preferred package based upon that output value.

Similarly, the present invention also includes a method of tracking printer usage to suggest appropriate packages to improve or maintain printer efficiency. This method comprises tracking usage of functional characteristics of a printer 10 in a computer memory 22; assigning fuzzy value scores to the usage of each of those functional characteristics; accessing information on a selection of packages of information that may be used to improve printer efficiency or reduce printing costs, including individual selection scores for each package; comparing the fuzzy value scores to the selection scores to select a preferred package; and suggesting the preferred package to a user of the printer 10.

It is preferred that suggesting the selected package be accomplished by sending an email to the user detailing the availability of the package. The information on the packages may be embedded in the printer memory 22 or downloaded from a network server 42 attached to the internet. The comparison of the fuzzy value scores to the selection scores may be done by directly comparing the fuzzy value scores for each functional characteristic to the selected scores for each package or by inputting the fuzzy values into a formula to arrive at an output value and then selecting the preferred package based upon that output value. The formula may be the same for each package, or may differ for each package.

The embodiments and figures provided and described herein do not limit the scope of the present invention. In each of its various embodiments, the system and methods of the present invention provides enhanced utility by increasing the efficiency or reducing the cost of using a printer based upon the actual usage of that printer, and the present invention may be carried out using embodiments different from those specifically described herein. Therefore, the scope of the present invention is not limited by the description provided by the present specification, but is defined by the appended claims.

What is claimed is:

1. A method of suggesting printer training packages based upon actual usage, comprising:

conveying a print job to a printer said printer including at least one functional characteristic, said print job requiring the utilization of said at least one functional characteristic;

assigning a numerical value to the degree of utilization of said at least one functional characteristic;

maintaining said numerical value in a memory of said printer;

accessing information on a selection of training packages;

comparing said information to said numerical value to select a preferred training package;

suggesting said preferred training package to a user of said printer.

2. The method of claim 1, where said printer includes a plurality of functional characteristics.

3. The method of claim 2, where said print job further comprises requiring the utilization of a number of said plurality of functional characteristics.

4. The method of claim 3, further comprising:

assigning individual numerical values to the degree of utilization of each of said plurality of functional characteristics; and maintaining said individual numerical values in said memory of said printer.

5. The method of claim 4, where comparing said information to said numerical value to select a preferred training package further comprises analyzing said individual numerical values to select said preferred training package based upon a number of said individual values.

6. The method of claim 4, where comparing said information to said numerical value to select a preferred training package further comprises inputting said individual numerical values into a formula to arrive at an output value and then selecting said preferred training package based upon said output value.

7. The method of claim 1, where suggesting said selected training package further comprises sending an email to said user detailing the availability of said selected training package.

8. The method of claim 1, where accessing information on said selection of training packages further comprises accessing information embedded in a memory on said printer.

9. The method of claim 1, were accessing information on said selection of training packages further comprises downloading said information from a network server attached to the internet.

10. A method of tracking printer use to suggest appropriate training packages, comprising:

tracking usage of functional characteristics of a printer in a computer memory;

assigning fuzzy value scores to said usage of each of said functional characteristics;

accessing information on a selection of training packages for training of said printer, said information containing individual selection scores for each of said training packages;

comparing said fuzzy value scores to said selection scores to select a preferred training package;

suggesting said preferred training package to a user of said printer.

11. The method of claim 10, where suggesting said selected training package further comprises sending an email to said user detailing the availability of said selected training package.

12. The method of claim 10, where accessing information on said selection of training packages further comprises accessing information embedded in a memory on said printer.

13. The method of claim 10, were accessing information on said selection of training packages further comprises downloading said information from a network server attached to the internet.

14. The method of claim 10, where comparing said fuzzy value scores to said selection scores further comprises analyzing said fuzzy value scores for each of said functional characteristics to select said preferred training package based directly upon a the fuzzy value scores for each of said functional characteristics.

15. The method of claim 10, where comparing said fuzzy value scores to said selection scores further comprises inputting said fuzzy values into a formula to arrive at an output value and then selecting said preferred training package based upon said output value.

16. A system for providing user responsive printer training, comprising:

a printer including a memory;

a usage record stored within said memory, said usage record including a history of a utilization of functional characteristics of said printer;

a selection database stored within said memory, said selection database containing information on a number of training packages for maintaining said printer;

a microprocessor located within said printer, said microprocessor capable of following a set of instructions to select a preferred training package by analyzing said usage record using a fuzzy logic protocol and comparing said analysis to said selection database.

17. The system of claim 16, further comprising a web server incorporated in said printer, said web server in communication with a computer network and configured to download said information on a number of training packages for maintaining said printer into said selection database.

18. The system of claim 17, where said web server is further configured to assemble and convey a message detailing said preferred training package to a user of said printer.

19. The system of claim 18, where said message is an email message.

20. The system of claim 16, wherein said set of instructions includes a fuzzy logic protocol.

21. The system of claim 16, further comprising a workstation in communication with said printer, said workstation capable of conveying a print job to said printer such that said print job is printed by said printer, utilizing one or more of said functional characteristics.

* * * * *

UNITED STATES PATENT AND TRADEMARK OFFICE

CERTIFICATE OF CORRECTION

PATENT NO. : 6,865,564 B2 Page 1 of 1
DATED : March 8, 2005
INVENTOR(S) : Parry

It is certified that error appears in the above-identified patent and that said Letters Patent is hereby corrected as shown below:

Column 11,
Line 12, delete "were" and insert therefor -- where --.
Line 39, delete "were" and insert therefor -- where --.

Signed and Sealed this

Thirteenth Day of December, 2005

JON W. DUDAS
*Director of the United States Patent and Trademark Office*